United States Patent [19]
Menger

[11] 3,780,598
[45] Dec. 25, 1973

[54] REMOTE CONTROL MIRROR
[75] Inventor: Keith J. Menger, Greenville, Ohio
[73] Assignee: Sheller-Globe Corporation, Toledo, Ohio
[22] Filed: Apr. 12, 1972
[21] Appl. No.: 243,234

[52] U.S. Cl............................ 74/501 M, 74/501 R
[51] Int. Cl. ............................................. F16c 1/10
[58] Field of Search ..................... 74/501 R, 501 M, 74/501 P

[56] References Cited
UNITED STATES PATENTS
R27,172   9/1971   VanNoord...................... 74/501 M
3,442,150   5/1969   Brawner et al.................. 74/501 M Primary Examiner—Charles J. Myhre
Assistant Examiner—Frank H. McKenzie, Jr.
Attorney—Arthur Raisch et al.

[57] ABSTRACT

A remote control mirror comprising a mirror support, a base, a trunnion, interengaging means between the trunnion and the base limiting the pivotal movement of the trunnion with respect to the base in a single plane about a first axis, and interengaging means between the trunnion and mirror support limiting the pivotal movement of the mirror support about a second axis at a right angle to the first axis. The mirror construction further includes cable means acting on the mirror support for selectively moving said mirror support into any desired position by the combined pivotal movement about each of the axes.

16 Claims, 18 Drawing Figures

PATENTED DEC 25 1973 3,780,598
SHEET 1 OF 2
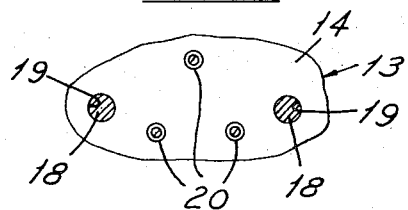
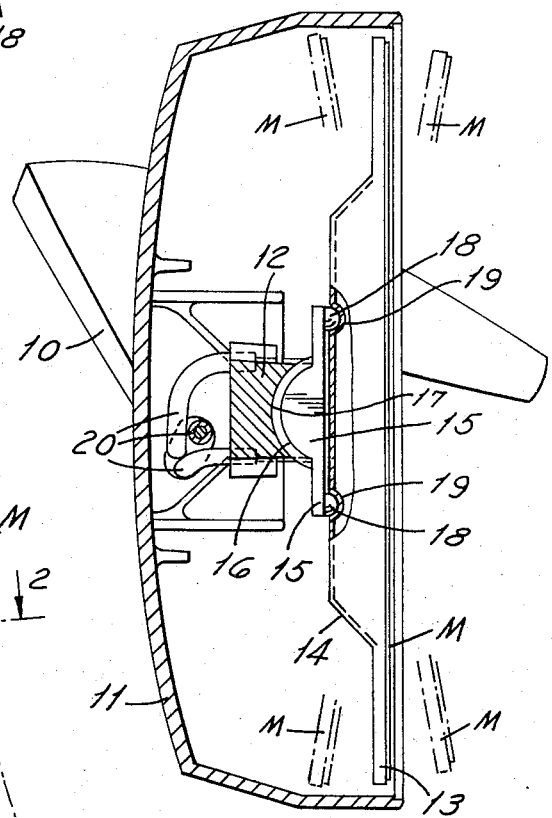
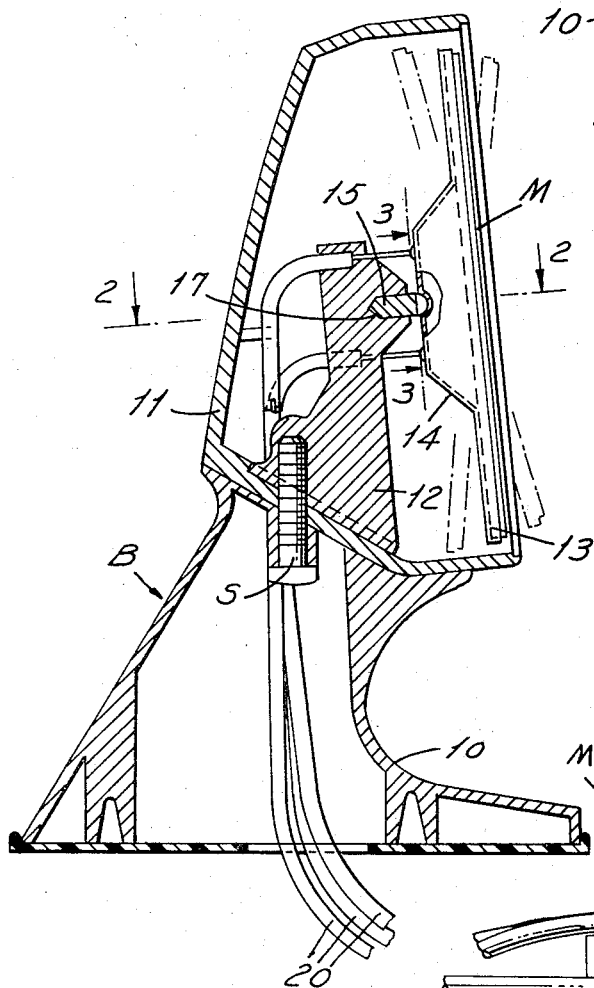
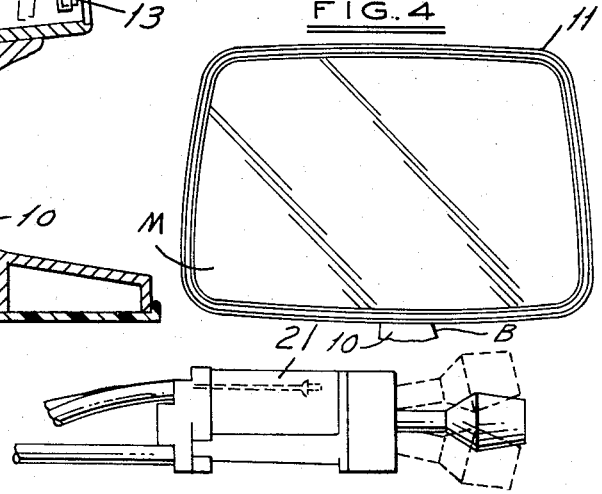

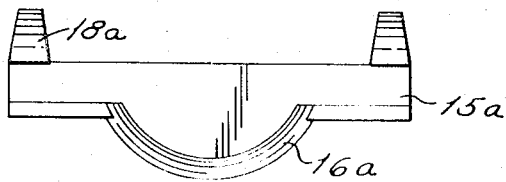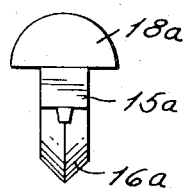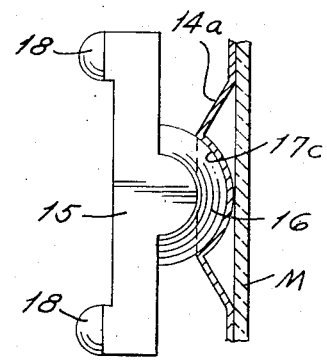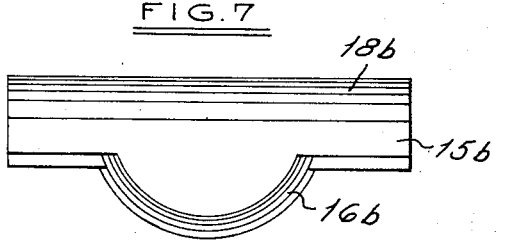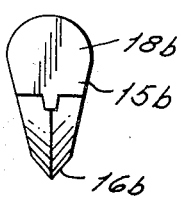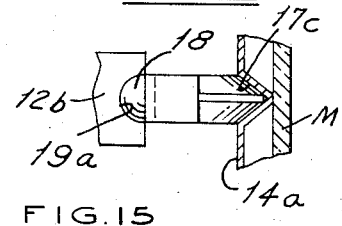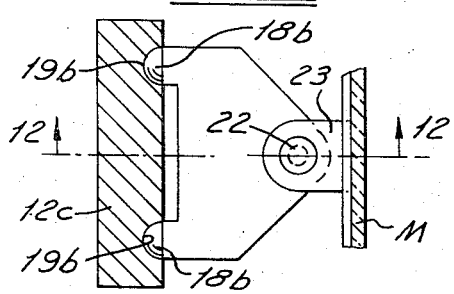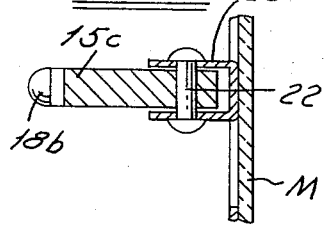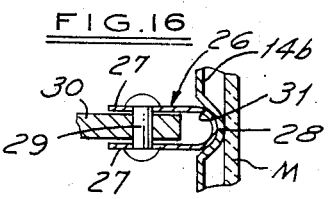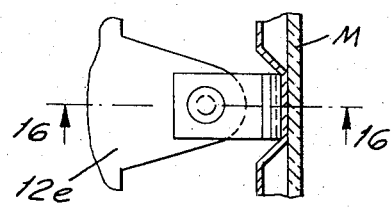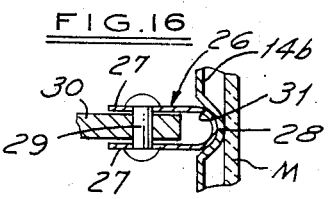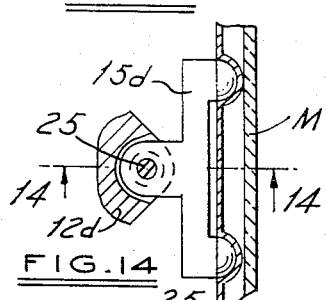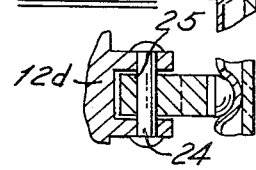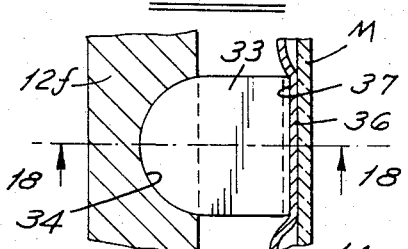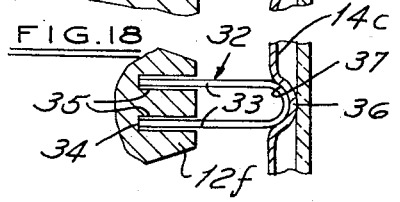

REMOTE CONTROL MIRROR

This invention relates to remote control mirrors and particularly to such mirrors which have a non-circular periphery.

BACKGROUND OF THE INVENTION

In a common type of remote controlled mirror used on automobiles and the like, the mirror is supported on a mirror support that is usually mounted by a ball and socket connection and spaced cables extend from the mirror support to a remote control for operating and adjusting the mirror support and, in turn, the mirror. One of the problems with such a mirror, especially where the mirror is generally rectangular rather than circular, is that the mirror tends to vibrate and rotate in the plane of the mirror. It has heretofore been suggested that spaced projections be provided on the mirror support which extend into openings of a plastic device to tend to prevent rotation of the mirror in the plane of the mirror. However, such a construction has not proven completely satisfactory. Specifically, mirror travel is restricted in the 1:30, 4:30, 7:30 and 10:30 positions of the mirror.

Among the objects of the invention are to provide a remotely controlled mirror wherein fluttering and vibration of the mirror are minimized; wherein rotation of the mirror in the plane of the mirror is obviated; wherein adjustment of the mirror in any direction is unrestricted; wherein the size of the pivot structure is reduced; wherein the construction is not adversely affected by wear of the component parts; and wherein the aforementioned advantages can be achieved with a construction that is relatively simple to manufacture and relatively low in cost.

SUMMARY OF THE INVENTION

In accordance with the invention, the remote control mirror comprises a mirror support, a base, a trunnion, interengaging means between the trunnion and the base limiting the pivotal movement of the trunnion with respect to the base in a single plane about a first axis, and interengaging means between the trunnion and mirror support limiting movement of the mirror support about a second axis at a right angle to the first-mentioned axis, cable means act on said mirror back for selectively moving said mirror back into any desired position by the combined pivotal movement about each of said axes.

DESCRIPTION OF THE DRAWINGS

FIG. 1 is a partly diagrammatic horizontal sectional view of a remotely controlled mirror embodying the invention.

FIG. 2 is a sectional view taken along the line 2—2 in FIG. 1.

FIG. 3 is a fragmentary sectional view taken along the line 3—3 in FIG. 1.

FIG. 4 is a fragmentary front elevational view.

FIG. 5 is a plan view of a modified form of trunnion.

FIG. 6 is a side elevational view of a trunnion shown in FIG. 5.

FIG. 7 is a plan view of a further modified form of trunnion.

FIG. 8 is a side elevational view of the trunnion shown in FIG. 7.

FIG. 9 is a fragmentary plan view of a modified form of mirror construction, parts being broken away.

FIG. 10 is a fragmentary side elevational view of the construction shown in FIG. 9.

FIG. 11 is a fragmentary part sectional plan view of a further modified form of the invention.

FIG. 12 is a fragmentary sectional view taken along the line 12—12 in FIG. 11.

FIG. 13 is a fragmentary part sectional plan view of a further modified form of the invention.

FIG. 14 is a fragmentary sectional view taken along the line 14—14 in FIG. 13.

FIG. 15 is a fragmentary part sectional plan view of a further modified form of the invention.

FIG. 16 is a fragmentary sectional view taken along the line 16—16 in FIG. 15.

FIG. 17 is a fragmentary part sectional plan view of a further modified form of the invention.

FIG. 18 is a fragmentary sectional view taken along the line 18—18 in FIG. 17.

DESCRIPTION

Referring to FIGS. 1 and 2, the mirror embodying the invention comprises a metal base B including a stanchion 10 which is adapted to be fixed to the exterior of the vehicle, for example, on the door and a metal base bracket 12 fixed on the base. A metal shell 11 is interposed between stanchion 10 and base bracket 12 surrounding base bracket 12. Stanchion 10, shell 11 and base bracket 12 are held in assembled relation by a screw S.

The mirror M of flat glass or the like, is generally rectangular and is fixed on a metal mirror support 13 having a central portion 14 spaced from the flat mirror. A metal trunnion 15 is provided and has an arcuate surface 16 engaging an arcuate groove 17 in the base bracket 12. The cross section of the groove 17 and surface 16 are non-circular, herein shown as triangular, so that the construction provides interengaging means between the trunnion 15 and base bracket 12 that limits pivotal movement of the trunnion about a single axis corresponding to the center of the radius of curvature of the groove 17.

The trunnion 15 is further provided with projections 18 that are spaced from one another on each side of the center of the radius of curvature of the portion 16 and are spherical. These engage complementary depressions 19 in the portion 14 of mirror support 13 and thereby limits pivotal movement of the mirror support 13 with respect to the trunnion 15 about a second axis that is at a right angle to the axis of the center of the groove 17.

Three Bowden cables 20 extend from a single handle control 21 to spaced points on the mirror back in accordance with conventional construction.

In order to adjust the position of the mirror, the remote control 21 is actuated to cause the cables to pivot the mirror about one of both of the axes to the desired position.

The construction provides for a mirror mount wherein fluttering and vibration are minimized and at the same time rotation of the mirror in the plane of the mirror is obviated. The mirror can be adjusted to any position without restriction. The construction of the pivot structure is such that it is of minimum size and is not adversely affected by wear of the component parts.

In the form of the invention shown in FIGS. 5 and 6, the trunnion 15a is substantially similar to that of the previous form of the invention, except that the projections 18a have a cylindrical cross section in a direction at a right angle to the plane of the curved portion 16a.

In the form of the invention shown in FIGS. 7 and 8, the projections form a part of a cylindrical surface 18b on trunnion body 15b that functions in a groove.

In the form of the invention shown in FIGS. 9 and 10, construction is reversed so that the groove 17c is on the mirror back 14a and, accordingly, the trunnion is reversed so that the curved portion 16 engages the groove 17c and the projections 18 engage indentations 19a in the base bracket 12b.

The form of the invention shown in FIGS. 11 and 12 is similar to that shown in FIGS. 9 and 10 except that the pivotal movement between the trunnion and the mirror support is achieved by a pivot pin 22 extending through a U-shaped bracket 23 formed by bending tabs outwardly from the mirror support and the trunnion 15c.

The form of the invention shown in FIGS. 13 and 14 comprises a reversal of the structure shown in FIGS. 11 and 12 and the trunnion 15d is pivoted about one axis to the base bracket 12d by a pivot pin 24 extending through flanges 25 on the base bracket 12d.

In the form of the invention shown in FIGS. 15 and 16, the trunnion 26 is in the form of a U-shaped metal bracket having legs 27 connected by a base 28. A pivot pin 29 extends through the legs 27 and a projection 30 on the base bracket 12e to provide the pivotal action about one axis and the base 28 has generally cyclindrical outer surface and extends into a groove 31 in the mirror support portion 14b to provide the pivotal action about the second axis.

The form of the invention shown in FIGS. 17 and 18 is similar to FIG. 16 except that the sheet metal trunnion 32 has spaced legs 33, the outer surfaces of which are curved as at 34 and extend into complementary grooves 35 in the base bracket 12f to provide the pivotal movement about one axis. Pivotal movement about the second axis is achieved by the curved surface of the base 36 of the trunnion engaging a groove 37 in the mirror support 14c, as in the form of the invention shown in FIGS. 15 and 16.

I claim:

1. In a remote control mirror, the combination comprising
   a mirror support,
   a base,
   a trunnion,
   interengaging means between the trunnion and the base limiting the pivotal movement of the trunnion with respect to the base in a single plane about a first axis,
   interengaging means between the trunnion and mirror support limiting the pivotal movement of the mirror support with respect to the trunnion about a second axis at a right angle to the first-mentioned axis,
   and means acting on said mirror back for selectively moving said mirror back into any desired position by the combined pivotal movement about each of said axes,
   said last-mentioned means comprising three cables connected to said mirror support at spaced points and a single operating lever for selectively manipulating said cables.

2. The combination set forth in claim 1 wherein one of said interengaging means comprises a pivot pin extending through said trunnion.

3. The combination set forth in claim 2 wherein said trunnion member comprises a solid body.

4. The combination set forth in claim 2 wherein said trunnion comprises a stamping of generally U-shaped cross section having spaced legs.

5. In a remote control mirror, the combination comprising
   a mirror support,
   a base,
   a trunnion,
   interengaging means between the trunnion and the base limiting the pivotal movement of the trunnion with respect to the base in a single plane about a first axis,
   interengaging means between the trunnion and mirror support limiting the pivotal movement of the mirror support with respect to the trunnion about a second axis at a right angle to the first mentioned axis,
   and means acting on said mirror back for selectively moving said mirror back into any desired position by the combined pivotal movement about each of said axes,
   said first-mentioned interengaging means comprising an arcuate groove in one of said base and said mirror back,
   said groove having a non-circular cross section,
   said trunnion having a complementary portion engaging said groove,
   the other of said base and said mirror support having recessed depressions which are arcuate in a cross section in a plane transverse to the plane of said complementary portion which engages said groove,
   said trunnion having complementary portions extending into and engaging said last-mentioned arcuate depressions.

6. The combination set forth in claim 5 wherein said arcuate groove is on said base and said arcuate depressions are on said mirror support.

7. The combination set forth in claim 5 wherein said arcuate groove is on said mirror support and said arcuate depressions are on said base.

8. The combination set forth in claim 5 wherein said portions of said trunnions which engage said arcuate depressions are spherical.

9. The combination set forth in claim 5 wherein said portions of said trunnion which engage said arcuate depressions are cylindrical.

10. The combination set forth in claim 9 wherein said arcuate depressions form a part of a groove that has a cylindrical cross section.

11. The combination set forth in claim 1 wherein said trunnion comprises a stamping of generally U-shaped cross section having spaced legs the edges of which define the complementary portion of the trunnion which engages said groove.

12. The combination set forth in claim 5 wherein said trunnion comprises a U-shaped stamping having a base and spaced legs,
   said base having a transverse curvature defining said complementary portions for engaging said depressions.

13. In a remote control mirror, the combination comprising
a mirror support,
a base,
a trunnion,
interengaging means between the trunnion and the base limiting the pivotal movement of the trunnion with respect to the base in a single plane about a first axis,
interengaging means between the trunnion and mirror support limiting the pivotal movement of the mirror support with respect to the trunnion about a second axis at a right angle to the first-mentioned axis,
and means acting on said mirror back for selectively moving said mirror back into any desired position by the combined pivotal movement about each of said axes,
said last-mentioned means comprising three cables connected to said mirror support at spaced points and a single operating lever for selectively manipulating said cables,
said first-mentioned interengaging means comprising an arcuate groove in said base,
said groove having a triangular cross section,
said trunnion having a complementary portion engaging said groove,
said mirror support having recessed depressions which have a cross section that is arcuate in a plane transverse to the plane of said complementary portion which engages said groove,
said trunnion having complementary portions extending into and engaging said last-mentioned arcuate depressions.

14. The combination set forth in claim 13 wherein said portions of said trunnion which engage said arcuate depressions are spherical.

15. The combination set forth in claim 13 wherein said portions of said trunnion which engage said arcuate depressions are cylindrical.

16. The combination set forth in claim 15 wherein said arcuate depressions form a part of a groove that has a cylindrical cross section.

* * * * *